(12) United States Patent
Chen (10) Patent No.: US 7,537,352 B2
(45) Date of Patent: May 26, 2009

(54) LIGHT EMITTING DIODE ILLUMINATION DEVICE CAPABLE OF PROVIDING UNIFORMLY POLARIZED LIGHT

(75) Inventor: Sung-Nan Chen, Hsin-Chu (TW)

(73) Assignee: Young Optics Inc., Hsinchu (TW)

( * ) Notice: Subject to any disclaimer, the term of this patent is extended or adjusted under 35 U.S.C. 154(b) by 107 days.

(21) Appl. No.: 11/876,220

(22) Filed: Oct. 22, 2007

(65) Prior Publication Data
US 2009/0103310 A1 Apr. 23, 2009

(51) Int. Cl.
*F21V 9/14* (2006.01)
*G02B 27/28* (2006.01)

(52) U.S. Cl. .......... 362/19; 362/608; 362/551; 362/555; 359/487; 359/495

(58) Field of Classification Search .......... 362/19, 362/608, 609, 800, 341; 359/486–487, 495, 359/497; 385/4, 11
See application file for complete search history.

(56) References Cited

U.S. PATENT DOCUMENTS

| | | | |
|---|---|---|---|
| 5,718,497 A * | 2/1998 | Yokoyama et al. | 362/625 |
| 6,234,639 B1 * | 5/2001 | Noguchi | 362/600 |
| 6,533,427 B2 | 3/2003 | Chang | |
| 6,587,269 B2 * | 7/2003 | Li | 359/497 |
| 6,698,891 B2 * | 3/2004 | Kato | 353/20 |
| 6,739,723 B1 | 5/2004 | Haven et al. | |
| 6,830,339 B2 * | 12/2004 | Maximus | 353/20 |
| 7,130,122 B2 * | 10/2006 | Li | 359/496 |
| 7,192,147 B2 | 3/2007 | Sakata et al. | |
| 7,261,453 B2 * | 8/2007 | Morejon et al. | 362/555 |
| 2003/0147137 A1 * | 8/2003 | Li | 359/485 |
| 2003/0231497 A1 | 12/2003 | Sakata et al. | |
| 2006/0056025 A1 * | 3/2006 | Li | 359/495 |
| 2007/0121310 A1 | 5/2007 | Sakata et al. | |

\* cited by examiner

*Primary Examiner*—Ali Alavi (57) ABSTRACT

A LED illumination device includes a tapered light guiding member, a LED, a reflective polarizer and a quarter-wave retarder. The light guiding member includes a light input surface and an opposite light output surface. The LED includes a LED chip and a reflective substrate on which the LED chip is mounted. The LED chip faces toward the light input surface. The reflective polarizer faces toward the light output surface, and allows a first polarization light to pass therethrough and reflects a second polarization light back into the light guiding member. The quarter-wave retarder is provided between the LED and the reflective polarizer. The reflective substrate reflects the second polarization light reflected by the reflective polarizer so as to make the second polarization light convert into the first polarization light after the light passes through the quarter-wave retarder a plurality of times.

15 Claims, 5 Drawing Sheets

LIGHT EMITTING DIODE ILLUMINATION DEVICE CAPABLE OF PROVIDING UNIFORMLY POLARIZED LIGHT

BACKGROUND

1. Technical Field

The present invention relates generally to an illumination device and, more particularly, to a Light Emitting Diode (LED) illumination device.

2. Description of the Related Art

In one aspect, many displays used in projection and direct viewing systems operate on the basis of polarization. Such displays include reflective displays such as LCoS (Liquid Crystal on Sillicon), super twisted nematic, and ferroelectric as well as transmissive displays, such as thin film transistor (TFT), poly-silicon, and Silicon-on-Insulator. These displays can produce a high resolution image by changing the polarization state upon reflection or transmission of incident light. In particular, for example, in an LCoS display, in the dark state, a pixel reflects all light with substantially no change in polarization. In the bright state, the pixel rotates the polarization state of reflected incident light to the corresponding orthogonal state. By illuminating the display with polarized light and then filtering out nearly all reflected or transmitted light of that polarization, the display image can be viewed by the human eye or projected onto a viewing screen.

In another aspect, in recent years, the LED has been widely used for illumination due to small power consumption and long life span, as well as enhanced reliability and durability. However, light directly emitted from a LED is not polarized and uniform enough, and therefore is not satisfied to directly apply for displays used in the projection and direct viewing systems.

Therefore, what is needed is to provide a LED illumination device capable of producing uniformly polarized light and thus suitable for displays used in projection and direct viewing systems.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF SUMMARY

A LED illumination device, in accordance with a present embodiment of the present invention, includes a light guiding member, a LED, a reflective polarizer and a quarter-wave retarder. The light guiding member includes a light input surface and an opposite light output surface. The light guiding member tapers along a direction oriented from light output surface to the light input surface, and is configured to uniformize light entered therein and output the uniformized light through the light output surface. The LED includes a LED chip and a reflective substrate on which the LED chip is mounted. The LED chip is configured to emit the light toward the light input surface of the tapered light guiding member, the light has a first polarization state and a second polarization state. The reflective polarizer is disposed to face toward the light output surface. The reflective polarizer allows the light of the first polarization state to pass therethrough and reflects the light of the second polarization state back into the light guiding member through the second end surface. The quarter-wave retarder is provided between the LED and the reflective polarizer. The reflective substrate of the LED is configured to reflect the light from the LED of the second polarization state reflected by the reflective polarizer so as to make the second polarization state convert into the first polarization state after the light passes through the quarter-wave retarder a plurality of times.

Another LED illumination device, in accordance with a present embodiment of the present invention, includes a light guiding member, a LED, a reflective polarizer, a quarter-wave retarder, and a mirror. The light guiding member has a light input surface and a light output surface adjoining the light input surface. The light guiding member tapers along a direction away from the light output surface and is configured to uniformize light entered therein through the light input surface and output the uniformized light through the light output surface. The LED includes a LED chip and a reflective substrate on which the LED chip is mounted. The LED chip is disposed to face toward the light input surface and configured to emit the light toward the light input surface, the light has a first polarization state and a second polarization state. The reflective polarizer is disposed to face toward the light output surface. The reflective polarizer allows the light of the first polarization state to pass therethrough and reflects the light of the second polarization state back into the light guiding member through the light output surface. The quarter-wave retarder is provided in an optical path of light emitted from the LED chip, reflected back into the light guiding member by the reflective polarizer and eventually passing through the reflective polarizer. The mirror is disposed in the optical path corresponding to the quarter-wave retarder. The mirror is configured to reflect the light from the LED of the second polarization state reflected by the reflective polarizer so as to make the second polarization state converted into the first polarization state after the light passes through the quarter-wave retarder a plurality of times.

Due to at least the configurations of the light guiding member, the reflective polarizer and the quarter-wave retarder which are cooperatively combined together could effectively uniformize and polarize the light emitted from the LED chip of the LED, the LED illumination devices in accordance with present embodiments as described above could provide a uniformly polarized light suitable for displays used in projection and direct viewing systems.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
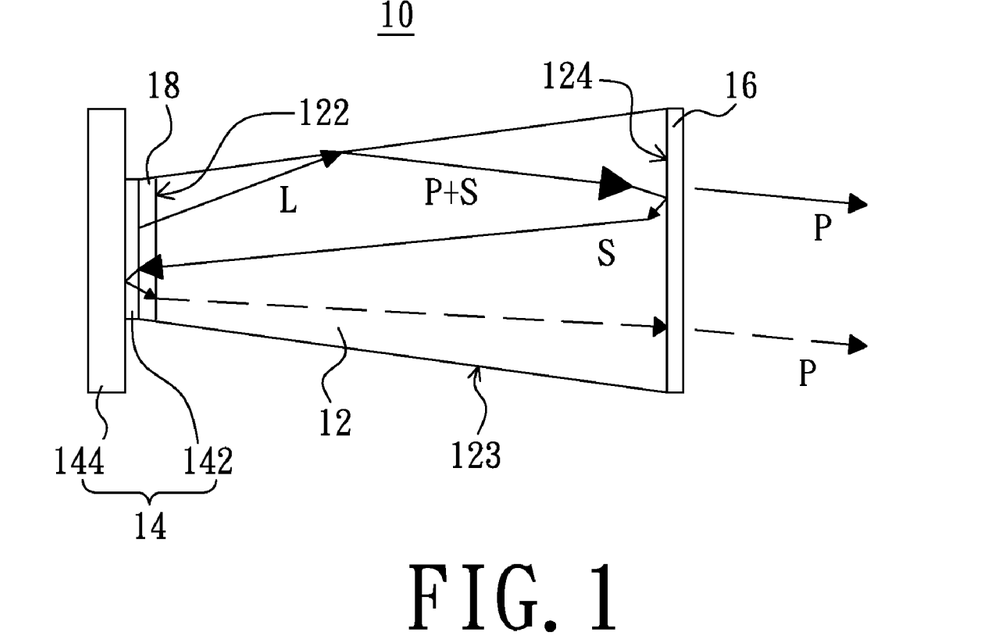
FIG. 1 is a schematic, cross sectional view of a LED illumination device, in accordance with a first embodiment of the present invention.

Referring to FIG. 1, a light emitting diode (LED) illumination device 10, in accordance with a first embodiment of the present invention, is provided. The LED illumination device 10 includes a light guiding member 12, a LED 14, a reflective polarizer 16, and a quarter-wave retarder 18.

The light guiding member 12 has a quadrangular prism-like shape and includes a first end surface 122, a second end surface 124 opposite to the first end surface 122, and multiple side surfaces 123 adjoining the first end surface 122 and the second end surface 124. The first end surface 122 and the second end surface 124 respectively act as the light input surface and the light output surface. The light guiding member 12 substantially linearly tapers along a direction oriented from the second end surface 124 to the first end surface 122. The light guiding member 12 is used for uniformizing light entered therein through the first end surface 122 thereof and outputting the uniformized light through the second end surface 124.

The LED 14 is disposed to face toward the first end surface 122 of the light guiding member 12. The LED 14 includes a LED chip 142 and a reflective substrate 144 on which the LED chip 142 is mounted. The LED chip 142 can be mounted on the reflective substrate 144 by an electrically conductive adhesive, such as silver ink. The reflective substrate 144 generally is equipped with a lead frame (not shown) used for powering the LED chip 142 to emit light. Light emitted from the LED chip 142 would be effectively direct toward the first end surface 122 through the reflection of the reflective substrate 144, and therefore the utilization efficiency of the light emitted from the LED chip 142 is improved. The light emitted from the LED chip 142 generally has a first polarization state and a second polarization state.

The reflective polarizer 16 is disposed to face toward the second end surface 124 of the prism-like shaped light guiding member 12. The reflective polarizer 16 allows light of a first polarization state (hereinafter will be referred to as p-polarization state for illustration purpose) to pass therethrough and reflects light of a second polarization state (hereinafter will be referred to as s-polarization state for illustration purpose). Thus, the reflective polarizer 16 could always emit light having the same polarization state. The reflective polarizer 16 may be a multilayer polarization plate or an inorganic grid polarizer.

The quarter-wave retarder 18 is disposed in an optical path of light emitted from the LED chip 142, reflected back into the light guiding member 12 by the reflective polarizer 16 and eventually passing/transmitting through the reflective polarizer 16. In particular, the quarter-wave retarder 18 is disposed between the LED 14 and the first end surface 122 of the light guiding member 12.

When the LED chip 142 is activated, light L emitted from the LED chip 142 passes through the quarter-wave retarder 18 and enters into the light guiding member 12 through the first end surface 122, then impinges on one of the side surfaces 123 and is thereafter directed toward the second end surface 124 for output. A part of the outputted light L having p-polarization state will transmit through the reflective polarizer 16 while the other part having s-polarization state will be reflected back into the light guiding member 12. The reflected light L of s-polarization state will be converted into the light of the p-polarization state (as indicated by dash line of FIG. 1) after passing through the quarter-wave retarder 18 for even times (e.g., two times, six times, etc.) and reflected toward the reflective polarizer 16 by the reflective substrate 144 for output. Consequently, a uniformly polarized light of the p-polarization state could be obtained. In addition, because the reflective substrate 144 of the LED 14 serves as reflection function and no additional reflector is necessarily needed, the manufacturing cost of the LED illumination device 10 is effectively reduced.

Figure 2:
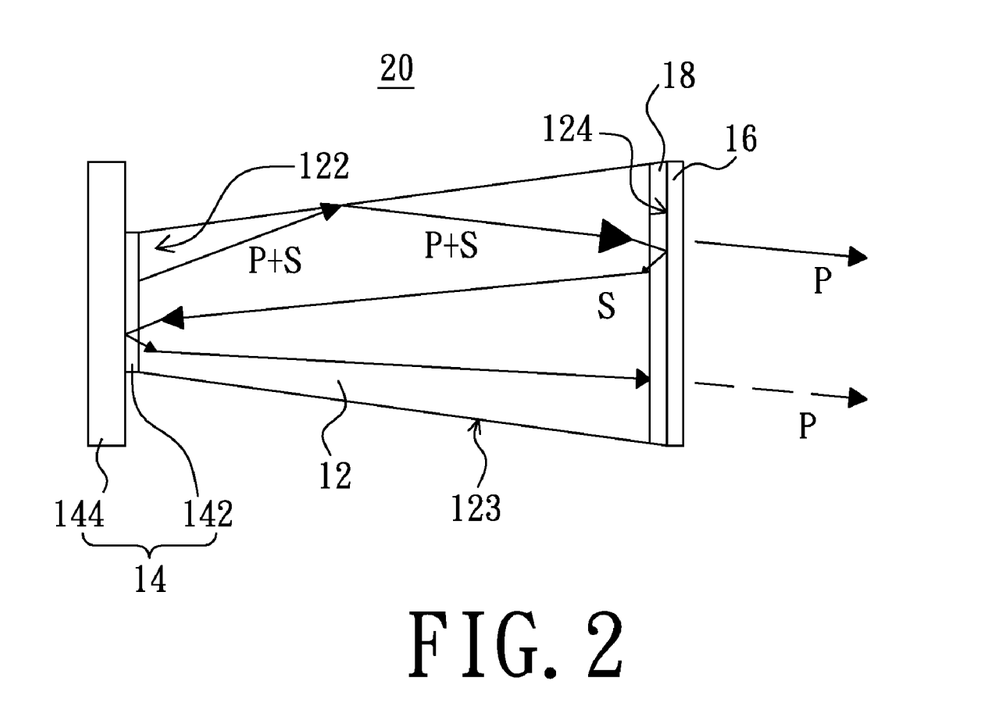
FIG. 2 is a schematic, cross sectional view of a LED illumination device, in accordance with a second embodiment of the present invention.

Referring to FIG. 2, a LED illumination device 20, in accordance with a second embodiment of the present invention, is provided. The LED illumination device 20 is similar to the LED illumination device 10 and also includes a prism-like shaped light guiding member 12, a LED 14, a reflective polarizer 16, and a quarter-wave retarder 18. A difference from the LED illumination device 10 is that the quarter-wave retarder 18 of the LED illumination device 20 is disposed between the second end surface 124 of the light guiding member 12 and the reflective polarizer 16, but not disposed between the LED 14 and the first end surface 122 of the light guiding member 12. Such position of the quarter-wave retarder 18 adjacent to the reflective polarizer 16 facilitates the polarization conversion of light much more.

When the LED chip 142 is activated, light L emitted from the LED chip 142 enters into the light guiding member 12 through the first end surface 122, then impinges on one of the side surfaces 123 and is thereafter directed toward the quarter-wave retarder 18 for output. A part of the outputted light L having p-polarization state will transmit through the reflective polarizer 16 while the other part having s-polarization state will be reflected back into the light guiding member 12. The reflected light L of s-polarization state will be converted into the light of the p-polarization state (as indicated by dash line of FIG. 2) after passing through the quarter-wave retarder 18 for even times and reflected toward the reflective polarizer 16 by the reflective substrate 144 for output. As a result, a uniformly polarized light of the p-polarization state could be obtained.

Figure 3:
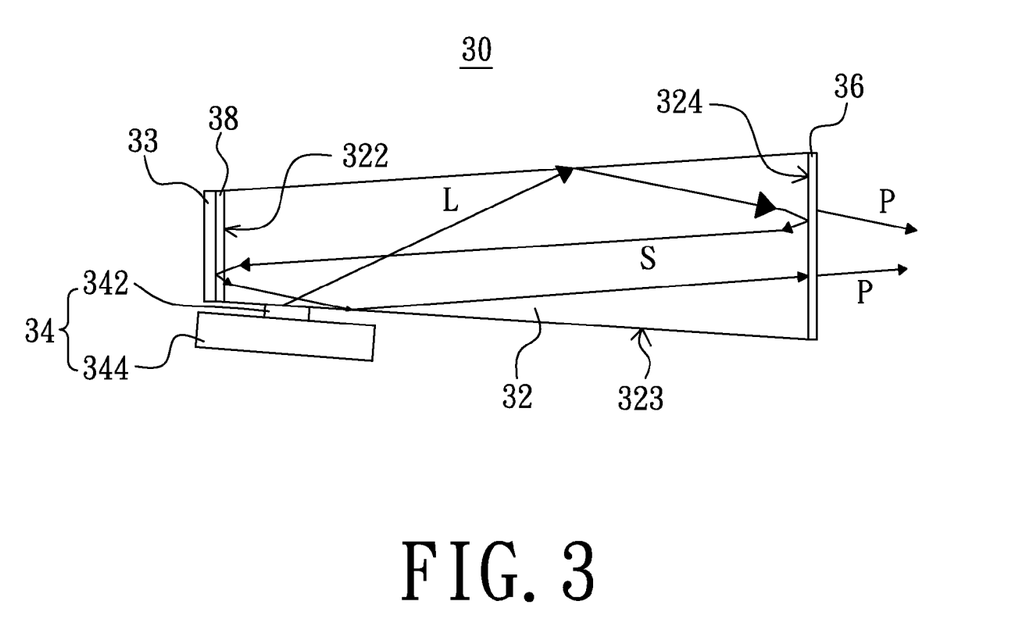
FIG. 3 is a schematic, cross sectional view of a LED illumination device, in accordance with a third embodiment of the present invention.

Referring to FIG. 3, a LED illumination device 30, in accordance with a third embodiment of the present invention, is provided. The LED illumination device 30 includes a light guiding member 32, a mirror 33, a LED 34, a reflective polarizer 36, and a quarter-wave retarder 38.

The light guiding member 32 generally has a quadrangular prism-like shape and includes a first end surface 322, a second end surface 324 opposite to the first end surface 322, and multiple side surfaces 323 adjoining the first end surface 322 and the second end surface 324. One of the multiple side surfaces 323 and the second end surface 324 respectively act as the light input surface and the light output surface. The light guiding member 32 substantially linearly tapers along a direction oriented from the second end surface 324 to the first end surface 322. The light guiding member 32 is used for uniformizing light entered therein and outputting the uniformized light through the second end surface 324. The light guiding member 32 is a transparent solid structure. Alternatively, the light guiding member 32 also can be a hollow structure with reflective side surfaces and at least one of the reflective side surfaces has a transparent portion permitting light incident.

The mirror 33 is disposed in an optical path of light emitted from the LED chip 342 and reflected back into the light guiding member 32 by the reflective polarizer 36, so that the mirror 33 reflects the light back into the light guiding member 32 and eventually make the light pass/transmit through the reflective polarizer 36. In particular, the mirror 33 is disposed to face toward the first end surface 322 of the light guiding member 32 for light reflection.

The LED 34 is disposed to face toward one of the side surfaces 323 and close to the first end surface 322. The LED 34 includes a LED chip 342 and a reflective substrate 344 on which the LED chip 342 is mounted. The LED chip 342 can be mounted on the reflective substrate 344 by an electrically conductive adhesive, such as silver ink. The reflective substrate 344 generally is equipped with a lead frame (not shown) used for powering the LED chip 342 to emit light. Light emitted from the LED chip 342 would be effectively direct toward the light guiding member 32 through the reflection of the reflective substrate 344, and therefore the utilization efficiency of the light emitted from the LED chip 342 is improved. The light emitted from the LED chip 342 generally has a first polarization state and a second polarization state.

The reflective polarizer 36 is disposed to face toward the second end surface 324 of the prism-like shaped light guiding member 32. The reflective polarizer 36 allows light of p-polarization state to pass therethrough and reflects light of s-polarization state. Thus, the reflective polarizer 36 could always emit light having the same polarization state. The reflective polarizer 36 may be a multilayer polarization plate or an inorganic grid polarizer.

The quarter-wave retarder 38 is disposed in the optical path of light emitted from the LED chip 342, reflected back into the light guiding member 32 by the reflective polarizer 36 and eventually passing/transmitting through the reflective polarizer 36. In particular, the quarter-wave retarder 38 is disposed between the mirror 33 and the first end surface 322 of the light guiding member 32.

When the LED chip 342 is activated, light L emitted from the LED chip 342 enters into the light guiding member 32 through the side surface 323 which the LED chip 322 faces toward, then impinges on an opposite side surface 323 and is thereafter directed toward the second end surface 324 for output. A part of the outputted light L having p-polarization state will transmit through the reflective polarizer 36 while the other part having s-polarization state will be reflected back into the light guiding member 32. The reflected light L of s-polarization state will be converted into the light of the p-polarization state after passing through the quarter-wave retarder 38 for even times and reflected toward the reflective polarizer 36 by the mirror 33 for eventual output. Accordingly, a uniformly polarized light of the p-polarization state could be obtained.

Figure 4:
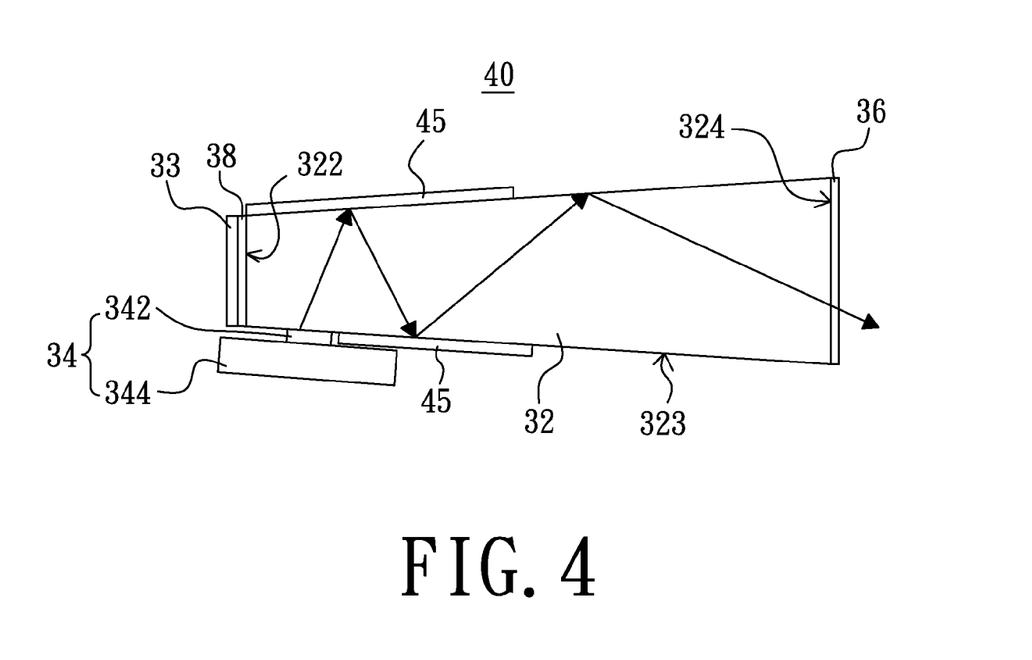
FIG. 4 is a schematic, cross sectional view of a LED illumination device, in accordance with a fourth embodiment of the present invention.

Referring to FIG. 4, a LED illumination device 40, in accordance with a fourth embodiment of the present invention, is provided. The LED illumination device 40 is similar to the LED illumination device 30 and also includes a prism-like shaped light guiding member 32, a mirror 33, a LED 34, a reflective polarizer 36, and a quarter-wave retarder 38. The difference from the LED illumination device 30 is that the LED illumination device 40 further includes multiple second mirrors 45.

The second mirrors 45 are disposed toward the side surfaces 323 which the LED chip 342 faces toward and close to the first end surface 322, so as to avoid light to escape from the side surfaces 323 of the light guiding member 32. Therefore, the light utilization efficiency of the LED illumination device 40 is further improved.

Figure 5:
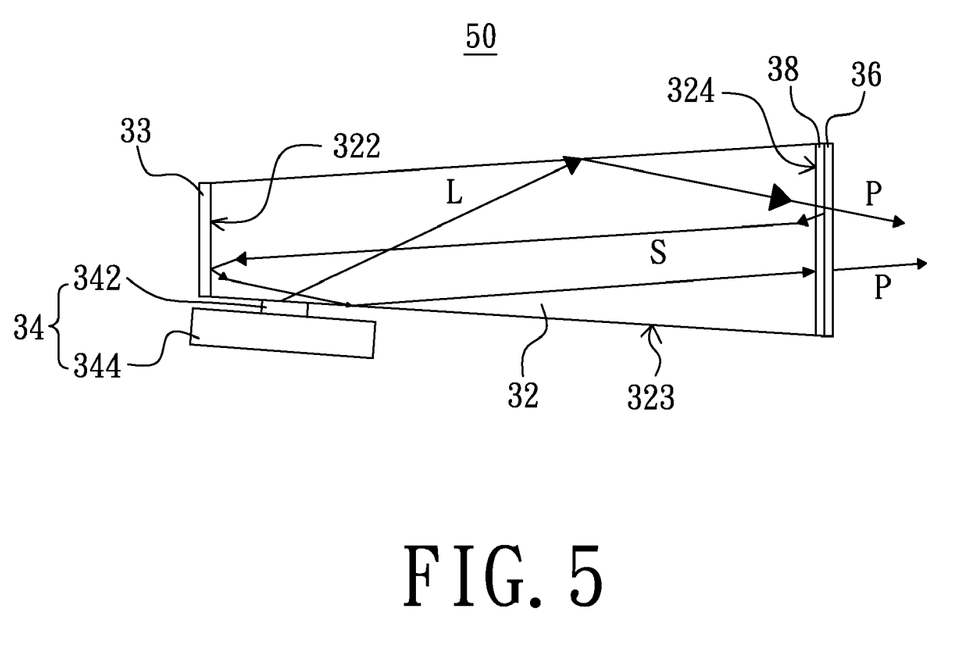
FIG. 5 is a schematic, cross sectional view of a LED illumination device, in accordance with a fifth embodiment of the present invention.

Referring to FIG. 5, a LED illumination device 50, in accordance with a fifth embodiment of the present invention, is provided. The LED illumination device 50 is similar to the LED illumination device 30 and also includes a prism-like shaped light guiding member 32, a mirror 33, a LED 34, a reflective polarizer 36, and a quarter-wave retarder 38. The difference from the LED illumination device 30 is that the quarter-wave retarder 38 is disposed between the second end surface 324 of the light guiding member 32 and the reflective polarizer 36, but not disposed between the mirror 33 and the first end surface 322 of the light guiding member 32. Such position of the quarter-wave retarder 38 facilitates the polarization conversion of light much more.

Figure 6:
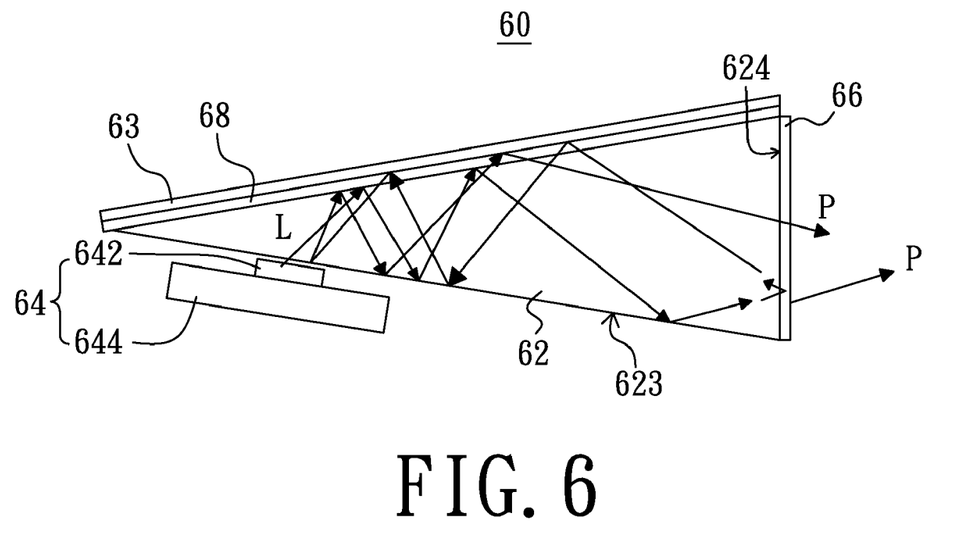
FIG. 6 is a schematic, cross sectional view of a LED illumination device, in accordance with a sixth embodiment of the present invention.

Referring to FIG. 6, a LED illumination device 60, in accordance with a sixth embodiment of the present invention, is provided. The LED illumination device 60 includes a light guiding member 62, a mirror 63, a LED 64, a reflective polarizer 66, and a quarter-wave retarder 68.

The light guiding member 62 generally has a quadrangular pyramid shape and includes an end surface 624 and multiple side surfaces 623 adjoining the end surface 624. The end surface 624 and one of the side surfaces 623 respectively act as the light output surface and the light input surface. The light guiding member 62 substantially linearly tapers along a direction away from the end surface 624. The light guiding member 62 is used for uniformizing light entered therein and outputting the uniformized light through the end surface 624.

The mirror 63 is disposed in an optical path of light emitted from the LED chip 642, reflected back into the light guiding member 62 by the reflective polarizer 66, so that the mirror 63 reflects the light back into the light guiding member 62 and eventually make the light pass/transmit through the reflective polarizer 66. In particular, the mirror 63 is disposed to face toward the one of the side surfaces 623 which the LED chip 342 faces toward, for light reflection. In the illustrated embodiment, as shown in FIG. 6, the mirror 63 fully/completely covers one of the side surfaces 623.

The LED 64 includes a LED chip 642 and a reflective substrate 644 on which the LED chip 642 is mounted. The LED chip 642 can be mounted on the reflective substrate 644 via an electrically conductive adhesive, such as silver ink. The reflective substrate 644 generally is equipped with a lead frame used for powering the LED chip 642 to emit light. Light emitted from the LED chip 642 would be effectively direct toward the light guiding member 62 through the reflection of the reflective substrate 644, and therefore the utilization efficiency of the light emitted from the LED chip 642 is improved. The light emitted from the LED chip 642 generally has a first polarization state and a second polarization state.

The reflective polarizer 66 is disposed to face toward the end surface 624 of the pyramid shaped light guiding member 62. The reflective polarizer 66 allows light of p-polarization state to pass therethrough and reflects light of s-polarization state. Thus, the reflective polarizer 66 could always emit light having the same polarization state. The reflective polarizer 66 may be a multilayer polarization plate or an inorganic grid polarizer.

The quarter-wave retarder 68 is disposed in the optical path of light emitted from the LED chip 642, reflected back into the light guiding member 62 by the reflective polarizer 66 and eventually passing/transmitting through the reflective polarizer 66. In particular, the quarter-wave retarder 68 is disposed between the mirror 63 and the side surface 623 of the light guiding member 62 which the mirror 63 faces toward. In the illustrated embodiment, as shown in FIG. 6, the quarter-wave retarder 68 fully covers one of the side surfaces 623 and generally attached to the mirror 63 together.

When the LED chip 642 is activated, light L emitted from the LED chip 642 enters into the light guiding member 62 through the corresponding side surface 623 which the LED chip 642 faces toward, then impinges on an opposite side surface 623 and is thereafter directed toward the end surface 624 for output. A part of the outputted light L having p-polarization state will transmit through the reflective polarizer 66 while the other part having s-polarization state will be reflected back into the light guiding member 62. The reflected light L of s-polarization state will be converted into the light of the p-polarization state after passing through the quarter-wave retarder 68 a plurality of times (e.g., odd times, or even times can be evenly divided by four) and reflected toward the reflective polarizer 66 by the mirror 63 for output. Accordingly, a uniformly polarized light of the p-polarization state could be obtained.

Figure 7:
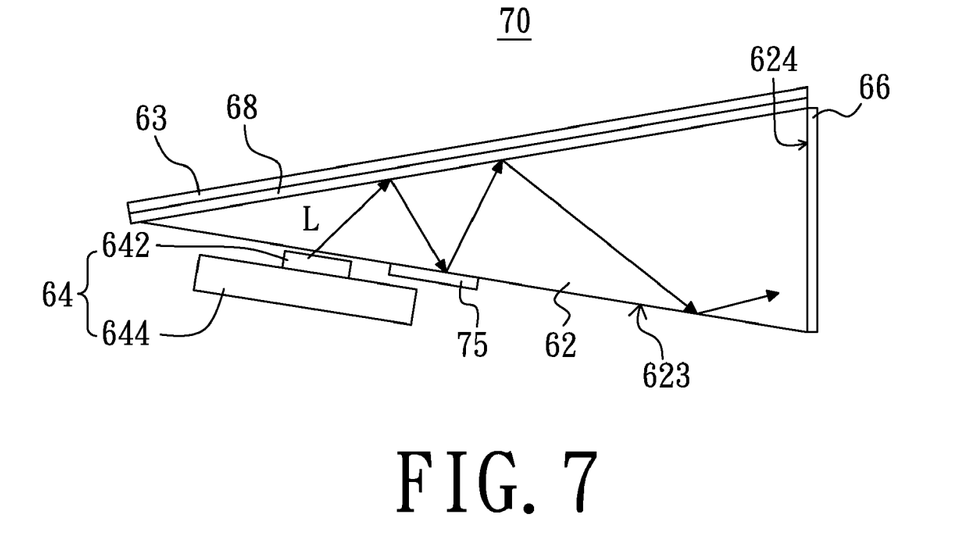
FIG. 7 is a schematic, cross sectional view of a LED illumination device, in accordance with a seventh embodiment of the present invention.

Referring to FIG. 7, a LED illumination device 70, in accordance with a seventh embodiment of the present invention, is provided. The LED illumination device 70 is similar to the LED illumination device 60 (as illustrated embodiment) and also includes a pyramid shaped light guiding member 62, a mirror 63, a LED 64, a reflective polarizer 66, and a quarter-wave retarder 68. The difference from the LED illumination device 60 is that the LED illumination device 70 further includes a second mirror 75.

The second mirror 75 is disposed to face toward the one of the side surfaces 623 which the LED 64 faces toward, so as to avoid light to escape from the corresponding side surface 623 of the light guiding member 62. Therefore, the light utilization efficiency of the LED illumination device 70 is further improved. As shown in FIG. 7, the second mirror 75 partly covers the corresponding side surface 623 for illustration purpose.

Figure 8:
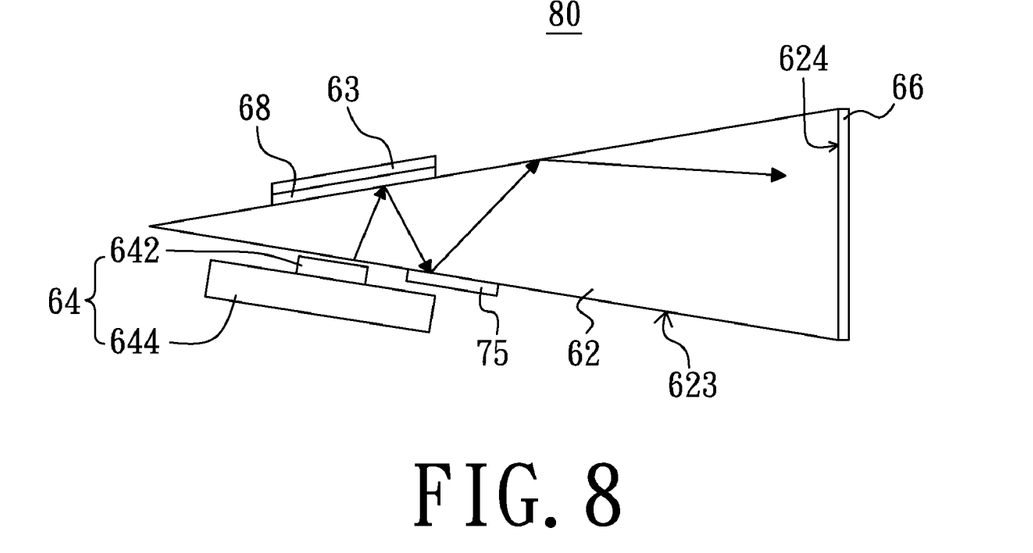
FIG. 8 is a schematic, cross sectional view of a LED illumination device, in accordance with an eighth embodiment of the present invention.

Referring to FIG. 8, a LED illumination device 80, in accordance with a eighth embodiment of the present invention, is provided. The LED illumination device 80 is similar to the LED illumination device 70 (as illustrated in FIG. 7) and also includes a pyramid shaped light guiding member 62, a mirror 63, a LED 64, a reflective polarizer 66, and a quarter-wave retarder 68. The difference from the LED illumination device 70 is that the mirror 63 and the quarter-wave retarder 68 of the LED illumination device 80 partly cover the corresponding side surface 623, so as to effectively reduce the manufacturing cost. The combination of the mirror 63 and quarter-wave retarder 68 is suitably disposed at a location of the corresponding side surface 623 away from the end surface 624 from which a large quantity of light may escape.

Figure 9:
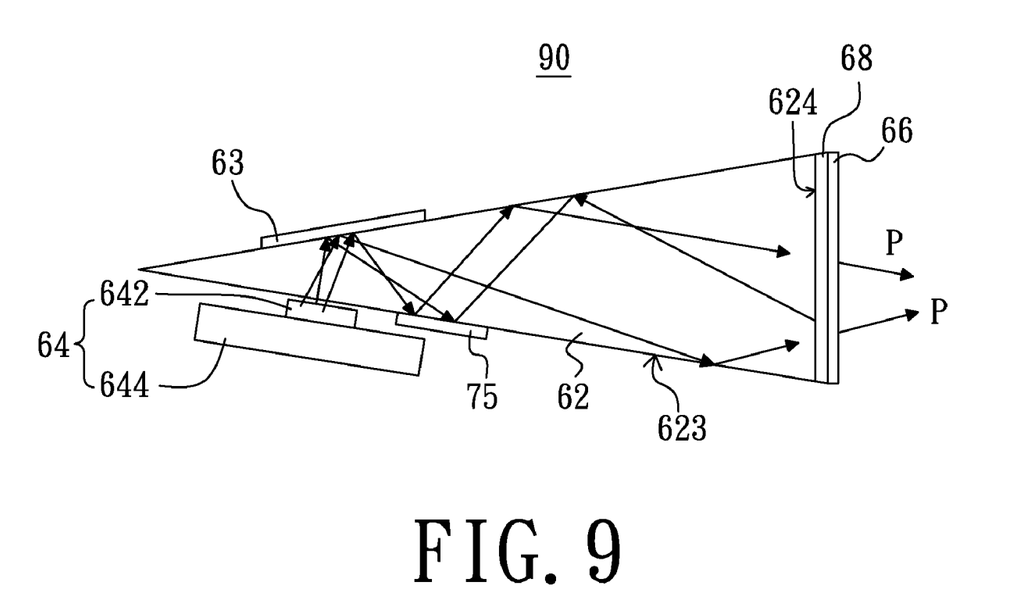
FIG. 9 is a schematic, cross sectional view of a LED illumination device, in accordance with a ninth embodiment of the present invention.

Referring to FIG. 9, a LED illumination device 90, in accordance with a ninth embodiment of the present invention, is provided. The LED illumination device 90 is similar to the LED illumination device 80 (as illustrated in FIG. 8) and also includes a pyramid shaped light guiding member 62, a mirror 63, a LED 64, a reflective polarizer 66, and a quarter-wave retarder 68. The difference from the LED illumination device 80 is that the quarter-wave retarder 68 of the LED illumination device 90 is disposed between the end surface 624 and the reflective polarizer 66, not disposed between the mirror 63 and the corresponding side surface 623. Such position of the quarter-wave retarder 68 adjacent to the reflective polarizer 66 facilitates the polarization conversion of light much more.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light emitting diode (LED) illumination device, comprising:
a light guiding member having a light input surface and a light output surface opposite to the light input surface, the light guiding member being tapered along a direction oriented from the light output surface to the light input surface, the light guiding member being configured to uniformize light entered therein through the light input surface and output the uniformized light through the light output surface;
a LED comprising a LED chip and a reflective substrate on which the LED chip is mounted, the LED chip being configured to emit the light toward the light input surface, wherein the light has a first polarization state and a second polarization state;
a reflective polarizer disposed to face toward the light output surface, the reflective polarizer allowing the light of the first polarization state to pass therethrough and reflecting the light of the second polarization state back into the light guiding member through the light output surface;
a quarter-wave retarder provided between the LED and the reflective polarizer, wherein the reflective substrate of the LED is configured to reflect the light from the LED of the second polarization state reflected by the reflective polarizer so as to make the second polarization state convert into the first polarization state after the light passes through the quarter-wave retarder a plurality of times.

2. The LED illumination device according to claim 1, wherein the quarter-wave retarder is located between the LED and the light input surface.

3. The LED illumination device according to claim 1, wherein the quarter-wave retarder is located between the light output surface and the reflective polarizer.

4. The LED illumination device according to claim 1, wherein the light guiding member has a quadrangular prism-like shape, the prism-like shaped light guiding member includes two opposite end surfaces, and the end surfaces respectively act as the light input surface and the light output surface.

5. A LED illumination device, comprising:
a light guiding member having a light input surface and a light output surface adjoining the light input surface, the light guiding member being tapered along a direction away from the light output surface and configured to uniformize light entered therein through the light input surface and output the uniformized light through the light output surface;
a LED comprising a LED chip and a reflective substrate on which the LED chip is mounted, the LED chip disposed to face toward the light input surface and configured to emit the light toward the light input surface, wherein the light has a first polarization state and a second polarization state;
a reflective polarizer disposed to face toward the light output surface, the reflective polarizer allowing the light of the first polarization state to pass therethrough and reflecting the light of the second polarization state back into the light guiding member through the light output surface;
a quarter-wave retarder provided in an optical path of the light emitted from the LED chip, reflected back into the light guiding member by the reflective polarizer and eventually passing through the reflective polarizer; and
a mirror disposed in the optical path corresponding to the quarter-wave retarder, the mirror being configured to reflect the light from the LED of the second polarization state reflected by the reflective polarizer so as to make the second polarization state convert into the first polarization state after the light passes through the quarter-wave retarder a plurality of times.

6. The LED illumination device according to claim 5, wherein the light guiding member has a prism-like shape, the prism-like shaped light guiding member comprises a first end surface, a second end surface opposite to the first end surface and a plurality of side surfaces adjoining the first and second end surfaces, one of the side surfaces and the second end surface respectively act as the light input surface and the light output surface, and the mirror is disposed to face toward the first end surface.

7. The LED illumination device according to claim 6, wherein the quarter-wave retarder is disposed between the mirror and the reflective polarizer.

8. The LED illumination device according to claim 7, wherein the quarter-wave retarder is disposed between the mirror and the first end surface of the prism-like shaped light guiding member.

9. The LED illumination device according to claim 7, wherein the quarter-wave retarder is disposed between the reflective polarizer and the second end surface of the prism-like shaped light guiding member.

10. The LED illumination device according to claim 7, further comprising at least a second mirror, the second mirror disposed to face toward one of the side surfaces.

11. The LED illumination device according to claim 5, wherein the light guiding member has a pyramid shape, the pyramid shaped light guiding member comprises an end surface and a plurality of side surfaces adjoining the end surface, one of the side surfaces and the end surface respectively act as the light input surface and the light output surface, the mirror is disposed to face toward one of the side surfaces facing toward the light input surface.

12. The LED illumination device according to claim 11, wherein the quarter-wave retarder is disposed between the mirror and the side surface which the mirror faces toward.

13. The LED illumination device according to claim 12, wherein the quarter-wave retarder and the mirror are attached to each other and both partly cover the side surface which the mirror faces toward.

14. The LED illumination device according to claim 12, further comprising a second mirror disposed to face toward the side surface which the LED chip faces toward.

15. The LED illumination device according to claim 11, wherein the quarter-wave retarder is disposed between the reflective polarizer and the end surface of the pyramid shaped light guiding member.

* * * * *